(12) United States Patent
Jensen

(10) Patent No.: US 8,743,914 B1
(45) Date of Patent: Jun. 3, 2014

(54) SIMULTANEOUS INDEPENDENT MULTI-BEAM ANALOG BEAMFORMER

(75) Inventor: Dana J. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 157 days.

(21) Appl. No.: 13/096,606

(22) Filed: Apr. 28, 2011

(51) Int. Cl.
*H04J 3/04* (2006.01)

(52) U.S. Cl.
USPC ............ 370/535; 370/310; 370/315; 370/537

(58) Field of Classification Search
USPC .......... 370/310, 315, 317; 342/377, 373, 354, 342/368, 374
See application file for complete search history.

(56) References Cited

U.S. PATENT DOCUMENTS

| | | | | |
|---|---|---|---|---|
| 6,005,515 A * | 12/1999 | Allen et al. | .................... | 342/374 |
| 6,539,158 B2 * | 3/2003 | Kashihara et al. | ............ | 385/129 |
| 6,766,074 B1 * | 7/2004 | Dingel et al. | ................... | 385/24 |
| 6,895,217 B1 * | 5/2005 | Chang et al. | ................. | 455/13.2 |
| 7,254,338 B2 * | 8/2007 | Kim et al. | ....................... | 398/93 |
| 7,359,642 B2 * | 4/2008 | Richardson et al. | .......... | 398/135 |
| 2002/0024975 A1 * | 2/2002 | Hendler | ......................... | 370/535 |
| 2003/0072396 A1 * | 4/2003 | Binshtok et al. | .............. | 375/346 |
| 2005/0206564 A1 * | 9/2005 | Mao et al. | ..................... | 342/377 |
| 2006/0073802 A1 * | 4/2006 | Chari et al. | ................ | 455/276.1 |
| 2009/0323582 A1 * | 12/2009 | Proctor et al. | ................ | 370/315 |
| 2010/0221997 A1 * | 9/2010 | Craig et al. | .................. | 455/12.1 |

* cited by examiner

*Primary Examiner* — Rasheed Gidado
(74) *Attorney, Agent, or Firm* — Donna P. Suchy; Daniel M. Barbieri

(57) ABSTRACT

An analog beamforming receiver may include a first receive element coupled with circuitry for sequentially adjusting at least one of a phase or a gain of a signal. The analog beamforming receiver may also include a second receive element coupled with circuitry for sequentially adjusting at least one of a phase or a gain of the signal. The analog beamforming receiver may further include a combiner coupled with the first receive element and the second receive element for combining the phase or gain adjusted signals to form a combined analog signal. The analog beamforming receiver may also include an analog to digital converter coupled with the combiner for converting the combined analog signal into digital samples. The analog beamforming receiver may further include a demultiplexer coupled with the analog to digital converter for demultiplexing the digital samples from the analog to digital converter into a plurality of demultiplexed signals.

15 Claims, 18 Drawing Sheets

SIMULTANEOUS INDEPENDENT MULTI-BEAM ANALOG BEAMFORMER

TECHNICAL FIELD

The present disclosure generally relates to the field of electronic signal reception, and more particularly to simultaneous independent multi-beam analog beamforming.

BACKGROUND

Directional antennas take many forms, including antennas that can be steered mechanically or electrically. Mechanical steering includes gimbaled antennas and can suffer from shortcomings including being relatively slow to point, bulky, expensive, and requiring a variety of moving parts. Further, mechanically steered antennas may require protection from exposure to elements that may lead to wear and maintenance issues. There are multiple types of antennas that can be steered electrically. Electrically steered antennas include antenna arrays which use beamforming and parasitic antennas which may turn "reflectors" on and off to direct the beam.

Parasitic antennas may have restrictions on element type and/or beam patterns. For instance, parasitic antennas typically require monopole, vertical polarization. Further, such antennas lack degrees of freedom on gain/phase that would otherwise allow for arbitrary point direction, null placement, and sidelobe reduction. Another limitation of parasitic antennas is narrow bandwidth (1.2:1), which limits tune range (e.g. when many channels occupy the bandwidth) and requires frequency hopping. Thus, parasitic antennas generally restrict the bandwidth of wideband waveforms such as Orthogonal Frequency Division Multiplexing (OFDM) and Direct-Sequence Spread-Spectrum (DSSS).

Digital beamforming (DBF) has many well known advantages, including the ability to apply multiple sets of weight vectors simultaneously to receive multiple beams. However, there can be some drawbacks to digital beamforming, including the need to have separate receive chains from each antenna element through the Analog to Digital Conversion (ADC) circuitry. This may require high speed Field-Programmable Gate Arrays (FPGAs) with many Input/Output (I/O) pins to receive the signals from the ADCs. This type of configuration may require significant power, which may lead to heat dissipation issues, may restrict operation time on battery power, and may affect power supply Size, Weight, Power, and Cost (SWaP-C). Further, some DBF algorithms require so much processing that large arrays become impractical. However, some alternative algorithms are suitable for analog beamforming, which can reduce the digital processing load.

An antenna array with analog beamforming (ABF) capability may be utilized for receiving Radio Frequency (RF) signals. The ABF array manipulates the phase and/or gain of signals arriving at each sensor/element, then sums the signals, and continues processing on the single input (e.g., utilizing an ADC). Typically, the beam formed by the gain/phase settings is maintained or tracked to follow one signal at a time. A simple example would include utilizing the phase/gain settings to point the antenna at a transmitter. The beam may be switched, for example, per Time Division Multiple Access (TDMA) slot, allowing for sequential beams, but not simultaneous beams. In order to achieve simultaneous beams, the signal from each antenna is typically split and fed to multiple sets of gain/phase adjustment hardware. There are some ABF techniques that may allow for multiple beams, such as Butler matrix and Rotman lens, but there are restrictions on the beam relationships.

SUMMARY

An analog beamforming receiver for forming multiple simultaneous independent beams may include a first receive element for receiving a signal, where the first receive element is coupled with circuitry for sequentially adjusting at least one of a phase or a gain of the signal received by the first receive element. The analog beamforming receiver may also include a second receive element for receiving the signal, where the second receive element coupled with circuitry for sequentially adjusting at least one of a phase or a gain of the signal received by the second receive element. The analog beamforming receiver may further include a combiner coupled with the first receive element and the second receive element for combining the phase or gain adjusted signals from the first receive element and the second receive element to form a combined analog signal. The analog beamforming receiver may also include an analog to digital converter coupled with the combiner for converting the combined analog signal from the combiner into a digital signal. The analog beamforming receiver may further include a demultiplexer coupled with the analog to digital converter for demultiplexing the digital signal from the analog to digital converter into a plurality of demultiplexed signals forming a plurality of multiple simultaneous independent beams.

A method for forming multiple simultaneous independent beams may include sequentially adjusting at least one of a phase or a gain of a signal received by a first receive element. The method may also include sequentially adjusting at least one of a phase or a gain of the signal received by a second receive element. The method may further include combining the phase or gain adjusted signals from the first receive element and the second receive element to form a combined analog signal. The method may also include converting the combined analog signal into a plurality of digital samples. The method may further include demultiplexing the plurality of digital samples into a plurality of demultiplexed signals forming a plurality of multiple simultaneous independent beams.

A system for forming multiple simultaneous independent beams may include a first adjustment module for sequentially adjusting at least one of a phase or a gain of a signal received by a first receive element. The system may also include a second adjustment module for sequentially adjusting at least one of a phase or a gain of the signal received by a second receive element. The system may further include a combining module coupled with the first adjustment module and the second adjustment module for combining the phase or gain adjusted signals from the first receive element and the second receive element to form a combined analog signal. The system may also include an analog to digital conversion module coupled with the combining module for converting the combined analog signal from the combining module into a digital signal. The system may further include a demultiplexing module coupled with the analog to digital conversion module for demultiplexing the digital signal from the analog to digital conversion module into a plurality of demultiplexed signals forming a plurality of multiple simultaneous independent beams. The switching time for the first adjustment module and the second adjustment module may be coordinated with a sample rate for the analog to digital conversion module.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1 through 18, an analog beamforming receiver 300 is described. In embodiments, the analog beamforming receiver 300 can provide a switched multi-beam architecture capable of receiving multiple independent beams simultaneously given a single phase/gain adjustment device per receive element with a single Analog to Digital Converter (ADC) in the receive path. In other embodiments, the analog beamforming receiver can utilize multiple phase/gain adjustment devices per receive element and/or multiple ADCs. The analog beamforming receiver 300 may be utilized for, but not limited to, directional communications and sensing, such as radar, Signals Intelligence (SigInt), directional spectral awareness, and the like. In embodiments, the analog beamforming receiver 300 may provide omni- or very wide band coverage. Additionally, the analog beamforming receiver 300 may provide coverage over a wide area.

Figure 1:
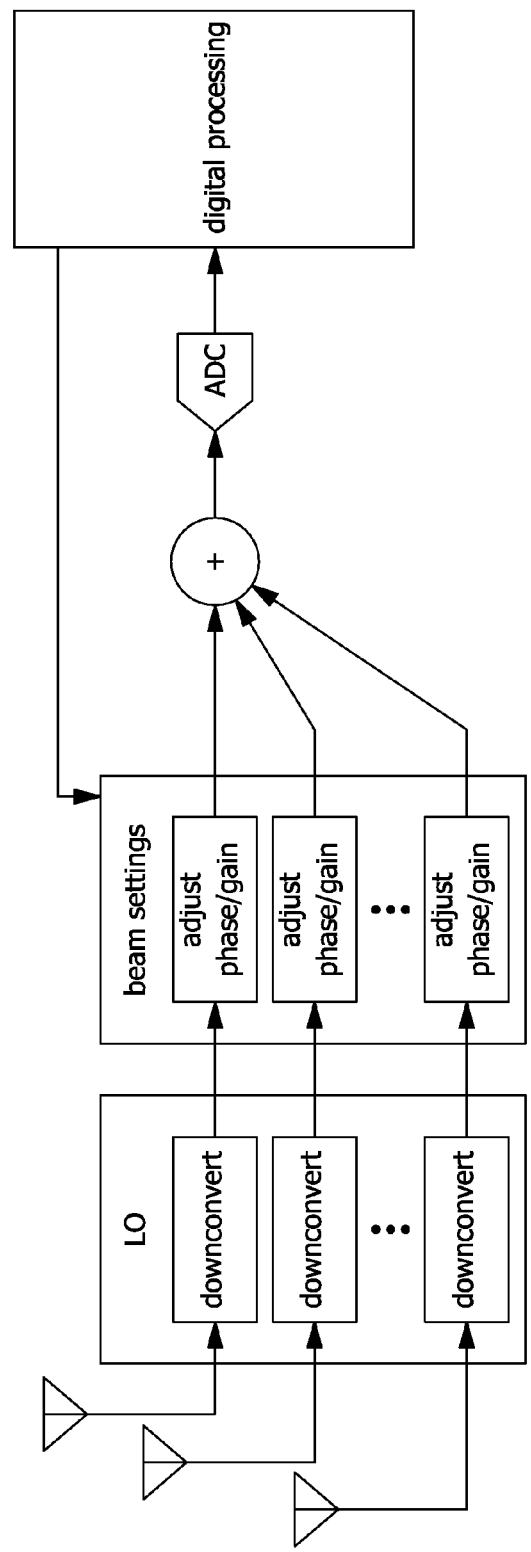
FIG. 1 is a block diagram illustrating an analog beamforming receiver capable of forming a single beam in accordance with the prior art.
Figure 2:
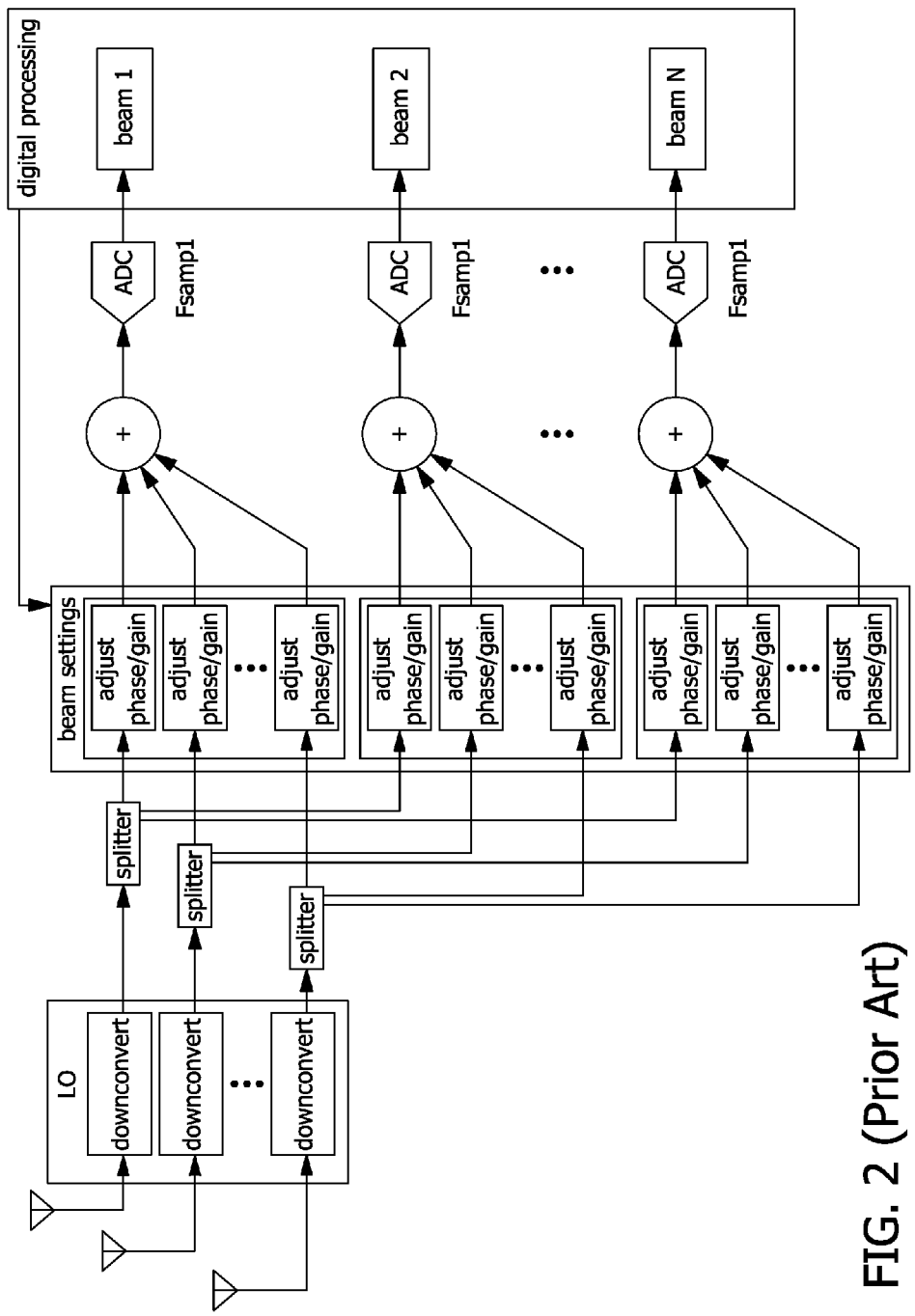
FIG. 2 is a block diagram illustrating an analog beamforming receiver capable of forming multiple simultaneous independent beams in accordance with the prior art.

A standard analog beamformer (as illustrated in FIG. 1) has the ability to form a single beam. This beam may be modified, for example, to track a source. It may also be switched to allow, for example, different beams on different Time Division Multiple Access (TDMA) slots. However, without multiple sets of gain/phase adjustment devices (as illustrated in FIG. 2), it does not provide the ability to receive multiple beams. The analog beamforming receiver 300 of the present disclosure can provide multiple simultaneous independent beams with a single set of hardware. The ability to quickly switch the gain/phase components of the analog beamforming receiver 300 makes it possible to time multiplex signal dwells at each beam onto a single analog signal. Coordinating the sample clock time with the beam switching provides a single sample per dwell. Demultiplexing the samples provides the sampled signals at each beam.

The simultaneous beams formed with the analog beamforming receiver 300 are independent, and there are no restrictions limiting where they point, or their shape with respect to the other beams. Thus, each beam is independent of all other beams and can take any beam shape realizable by the given element pattern, geometry, and gain/phase adjustment resolution. Filtering prior to the gain/phase adjustments of the analog beamforming receiver 300 may be utilized to restrict the receive signal bandwidth and provide anti-aliasing at the beam sample rate. Given N simultaneous beams, the multiplexed dwells may be sampled with an ADC that operates at a rate N times the sample rate per beam. To prevent the discontinuities between dwells from corrupting the dwell's sample, the ADC may be provided with a wide input bandwidth.

Figure 3:
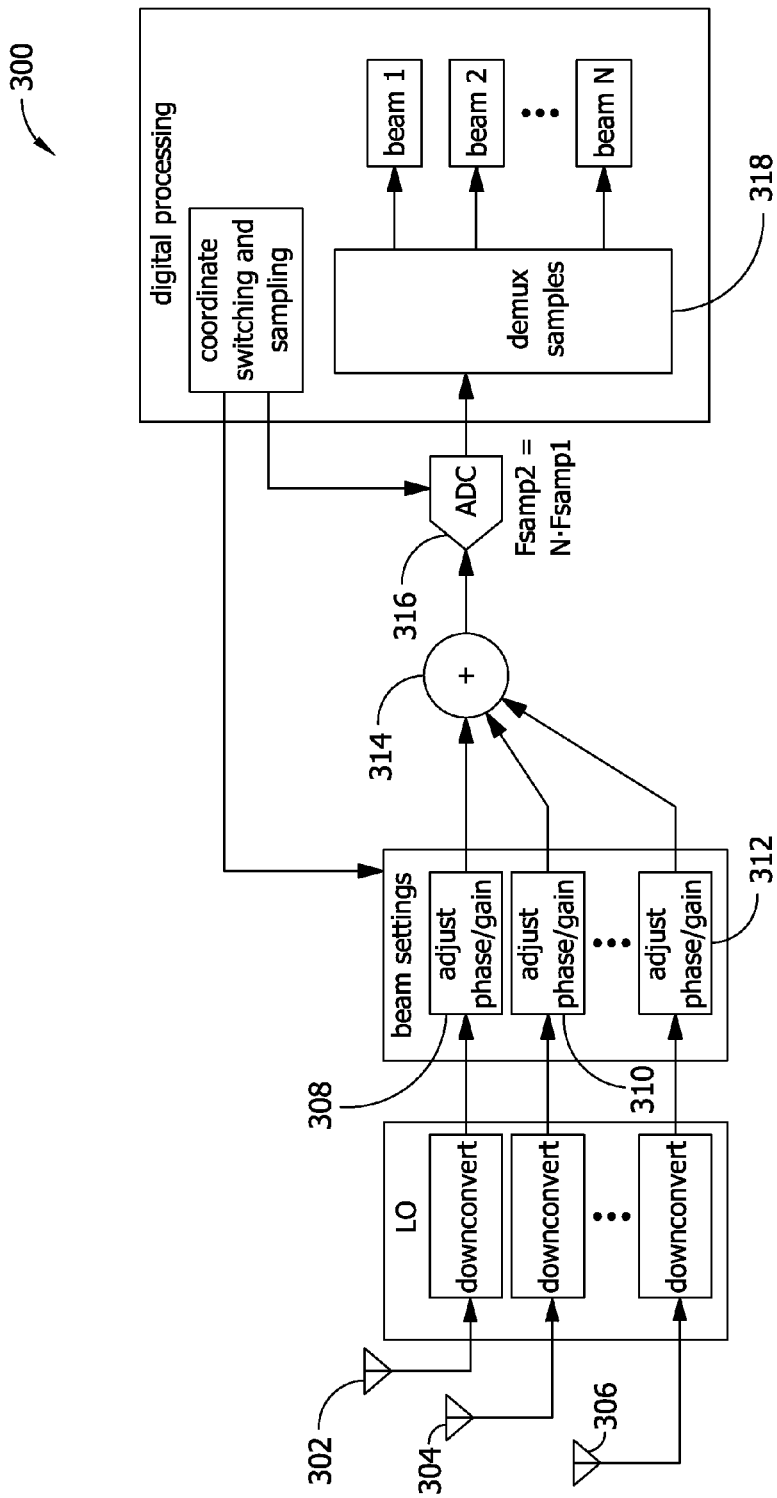
FIG. 3 is a block diagram illustrating an analog beamforming receiver capable of forming multiple simultaneous independent beams with a single set of hardware, where the analog beamforming receiver requires a single phase/gain adjustment device per receive element and a single Analog to Digital Converter (ADC) in the receive path.
Figure 4:
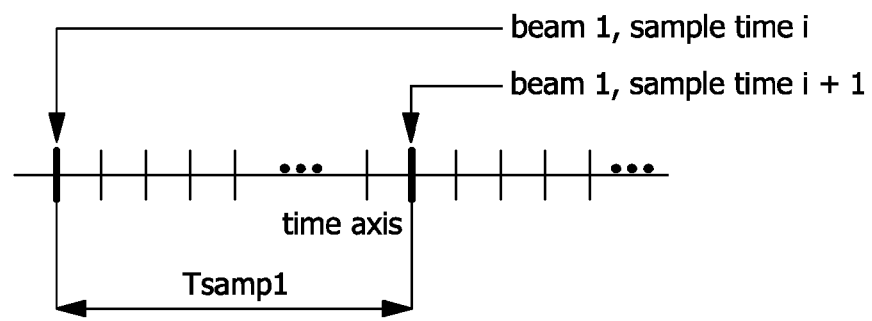
FIG. 4 is a schematic illustrating sample time per beam and receive direction when sampling one beam at a sampling rate of Fsamp1.
Figure 4:
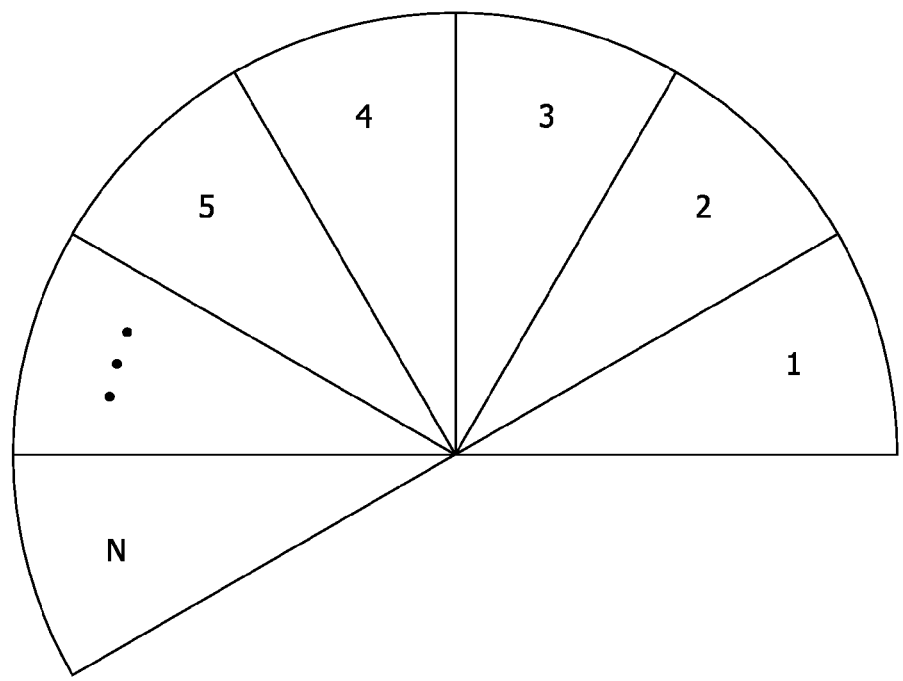
Figure 5:
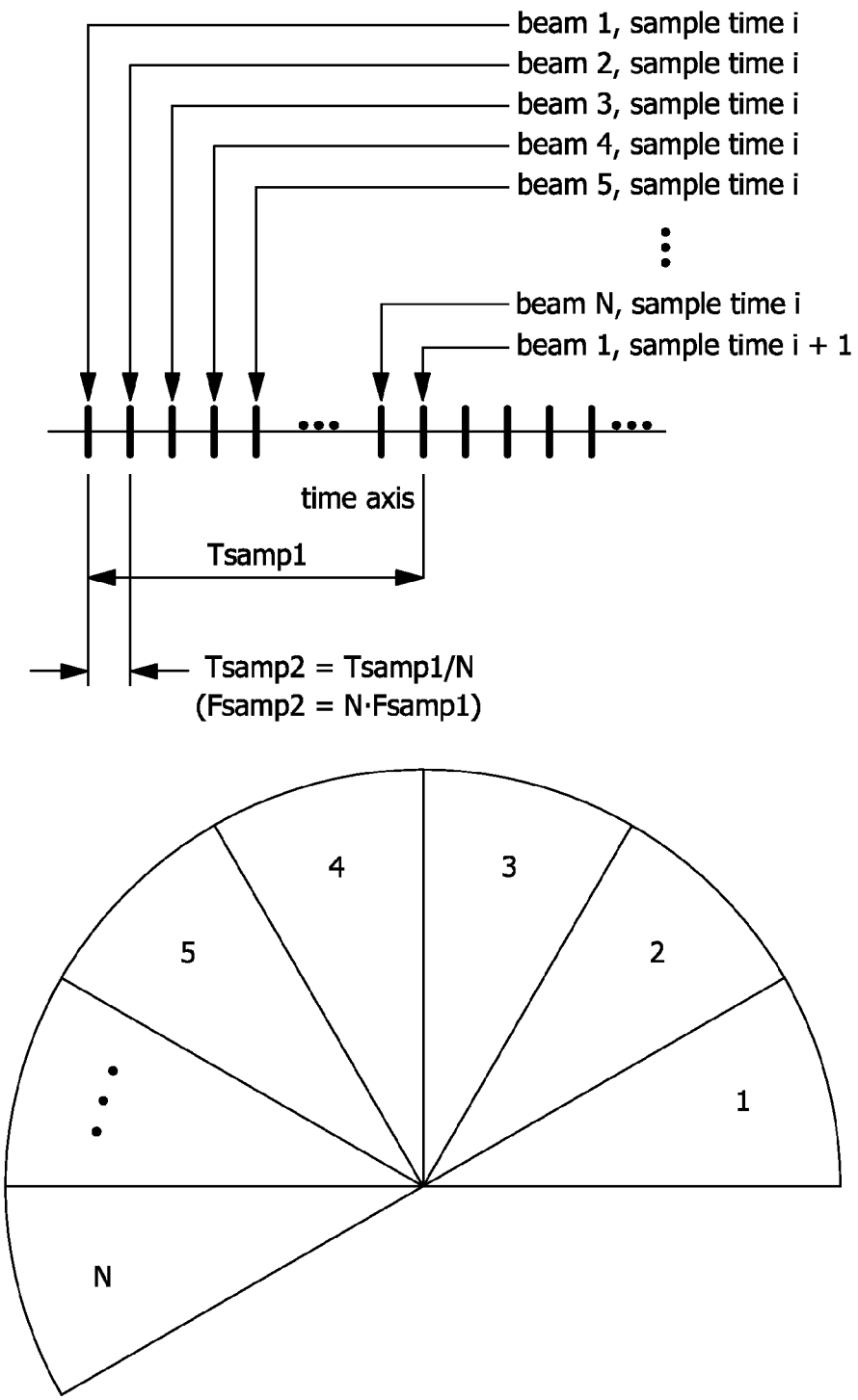
FIG. 5 is a schematic illustrating sample time per beam and receive direction when sampling N beams, each at a sampling rate of Fsamp1.

Referring now to FIG. 3, the analog beamforming receiver 300 is described. The analog beamforming receiver 300 includes multiple signal receiving elements, such as a receive element 302, a receive element 304, a receive element 306, and possibly other receiving elements. The receive elements 302, 304, and 306 are connected to adjustment modules, such as circuitry 308, 310, and 312 for sequentially adjusting the phase and/or gain of signals received by the receive elements. The analog beamforming receiver 300 includes a combining/summing module, such as a combiner 314 connected to the receive elements for combining the phase/gain adjusted signals to form a combined analog signal. The analog beamforming receiver 300 also includes an ADC module, such as an analog to digital converter 316 coupled with the combiner 314 for converting the combined analog signal from the combiner into digital samples (e.g., a digital signal). The analog beamforming receiver 300 further include a demultiplexing module, such as a demultiplexer 318 coupled with the analog to digital converter 316 for demultiplexing the digital samples from the analog to digital converter into a number of demultiplexed signals forming multiple simultaneous independent beams.

Figure 6:
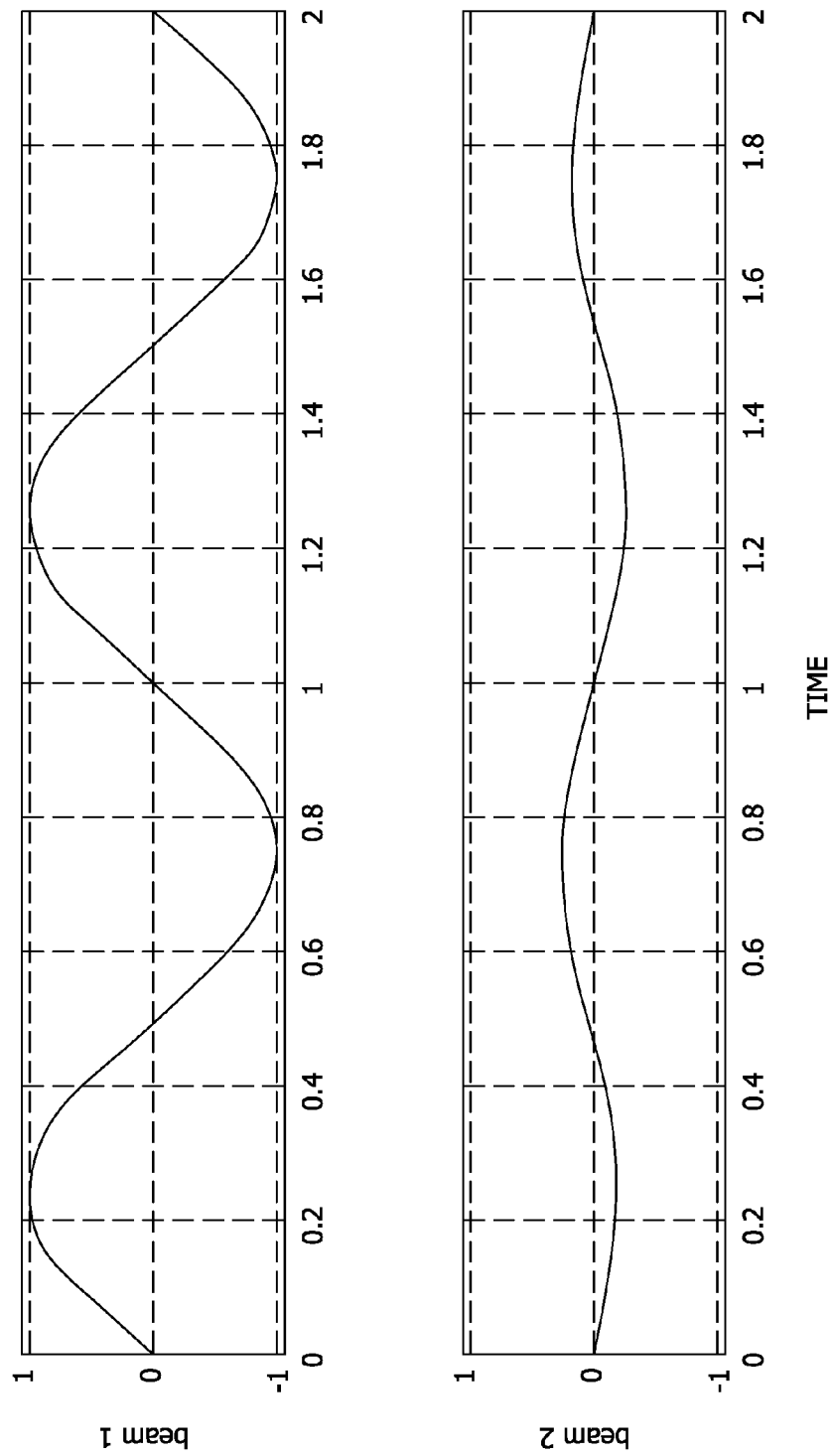
FIG. 6 is a series of graphs illustrating signals received from two beams.
Figure 7:
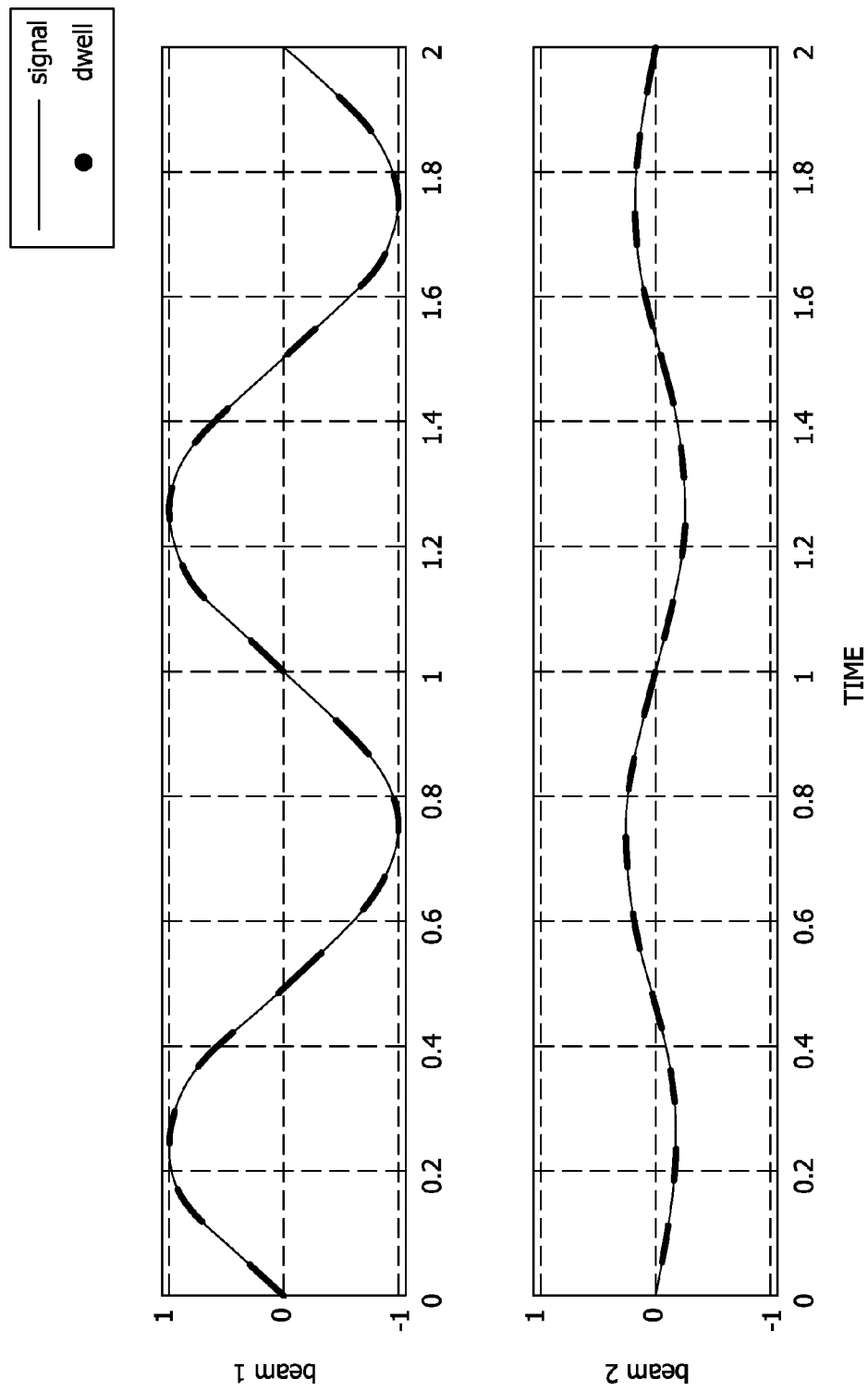
FIG. 7 is a series of graphs illustrating signals received from two beams, and portions of the two signals on which an analog beamforming receiver is directed to sequentially dwell.
Figure 8:
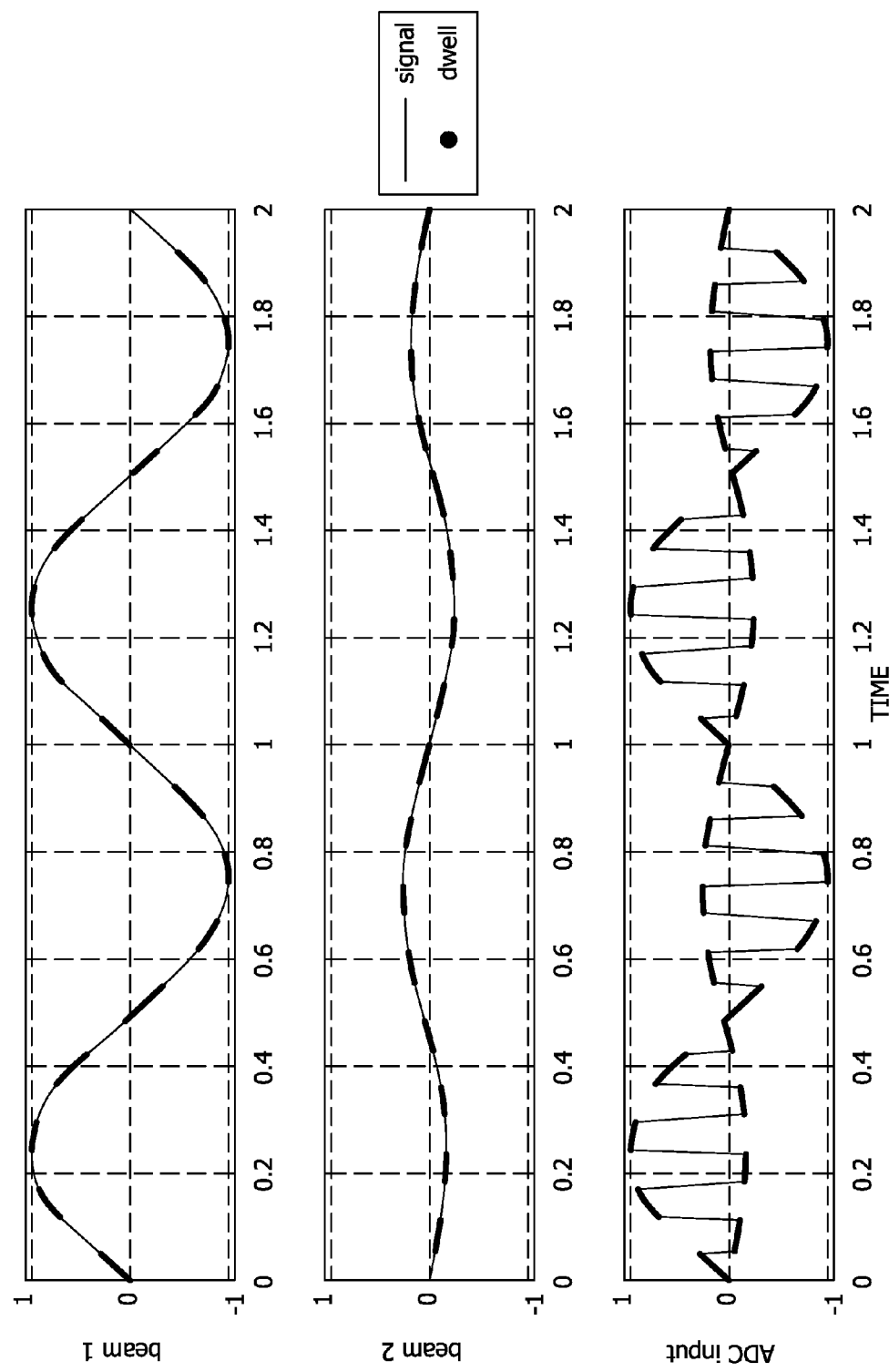
FIG. 8 is a series of graphs illustrating signals received from two beams, portions of the two signals on which an analog beamforming receiver is directed to sequentially dwell, and a signal arriving at the input of an ADC, where the signal represents the time-multiplexed dwells.
Figure 9:
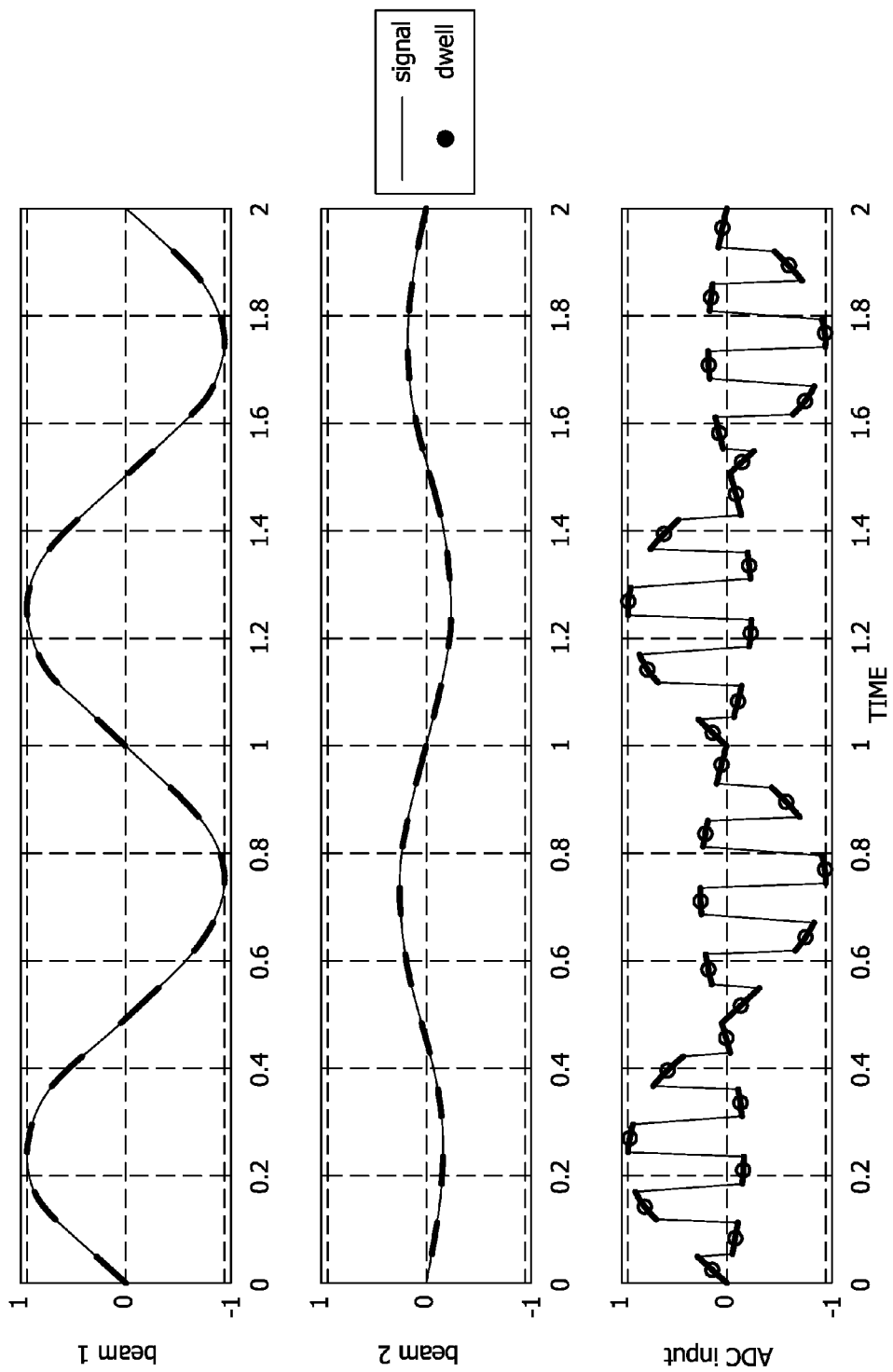
FIG. 9 is a series of graphs illustrating signals received from two beams, portions of the two signals on which an analog beamforming receiver is directed to sequentially dwell, a signal arriving at the input of an ADC, and sample positions in the middle of each beam dwell.
Figure 10:
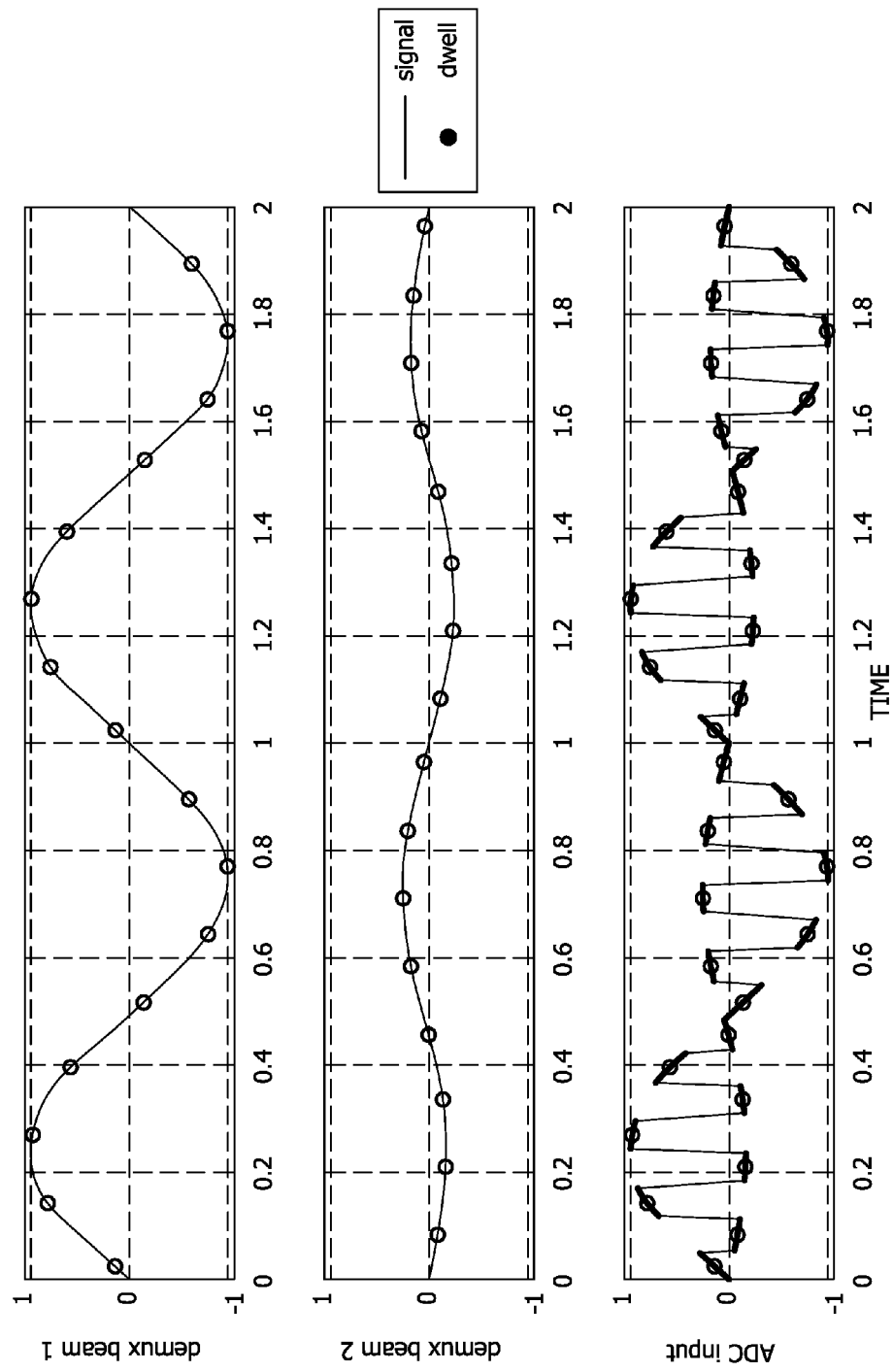
FIG. 10 is a series of graphs illustrating two beams demultiplexed from the ADC samples shown in FIG. 9, and the number of samples per beam after the ADC input has been demultiplexed.
Figure 11:
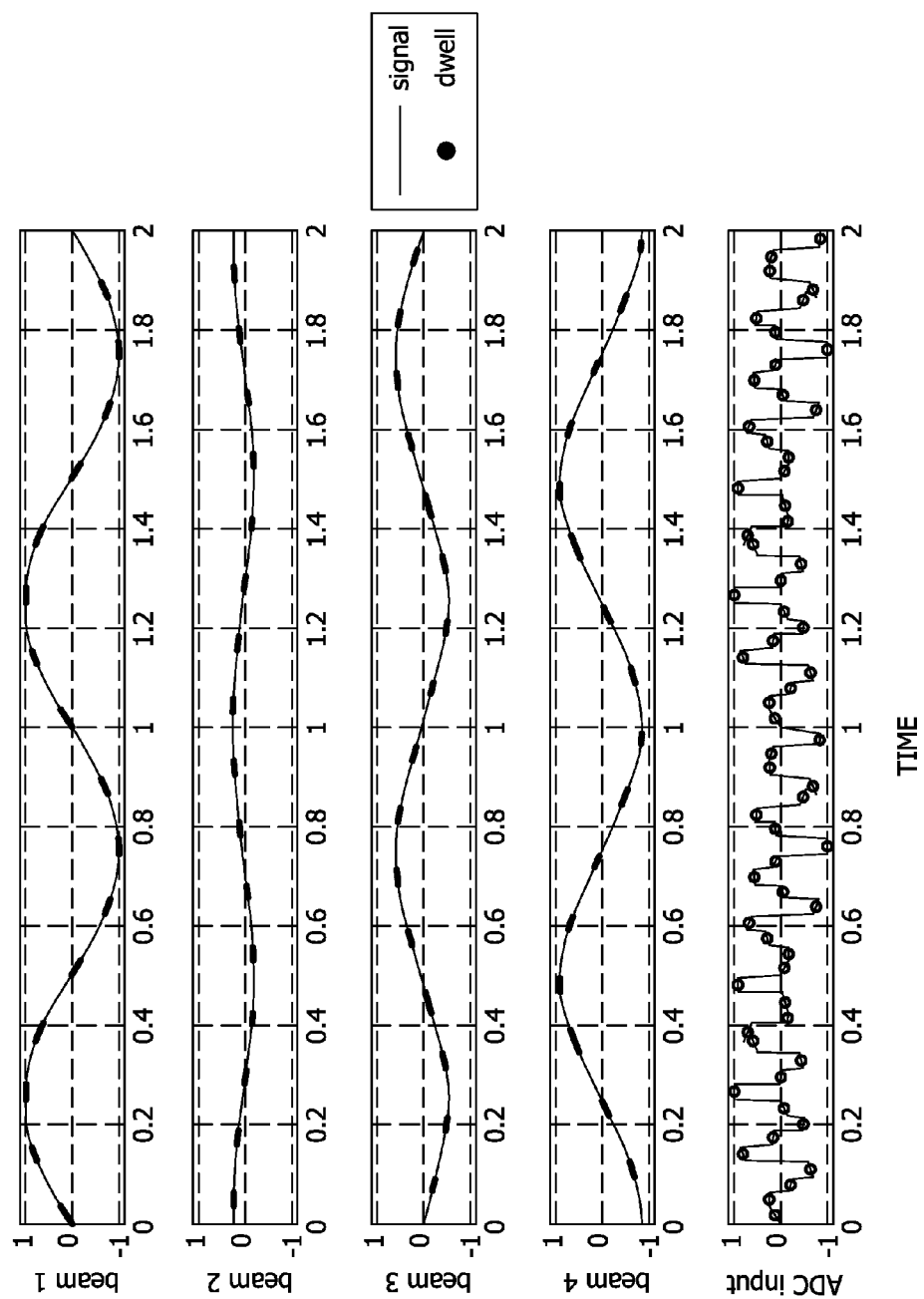
FIG. 11 is a series of graphs illustrating signals received from four beams, portions of the four signals on which an analog beamforming receiver is directed to sequentially dwell, a signal arriving at the input of an ADC, and sample positions in the middle of each beam dwell.
Figure 12:
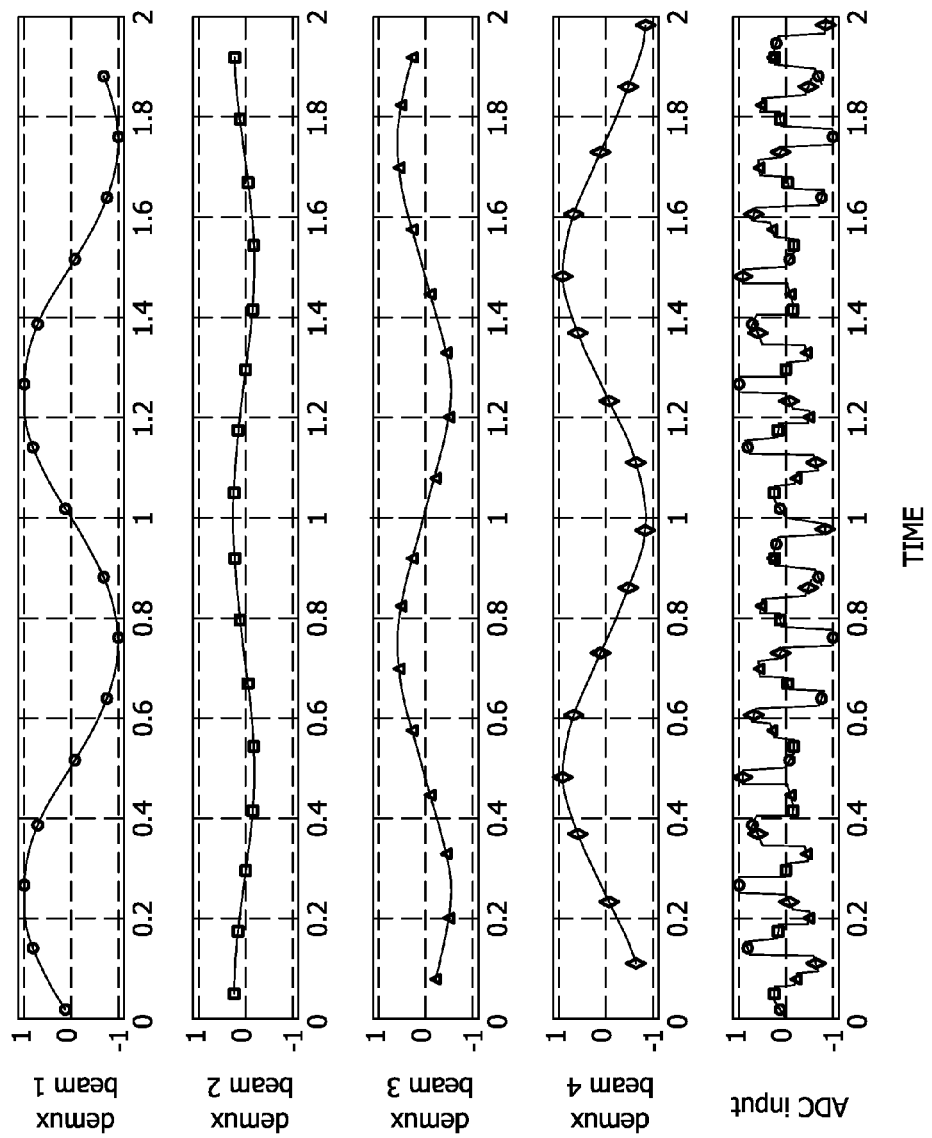
FIG. 12 is a series of graphs illustrating four beams demultiplexed from the ADC samples shown in FIG. 11, and the number of samples per beam after the ADC input has been demultiplexed.

Referring now to FIGS. 6 through 10, an example utilizing two beams is illustrated. Signals received from two beams are depicted in FIG. 6. FIG. 7 illustrates portions of the two signals on which an analog beamforming receiver is directed to sequentially dwell. FIG. 8 illustrates the signal arriving at the ADC input of the analog beamforming receiver. FIG. 9 illustrates a sample position on each beam dwell. FIG. 10 illustrates the samples per beam and the beams after the ADC samples have been demultiplexed. It should be noted that after demultiplexing, the signal for each beam appears as if it was received continuously. Referring now to FIGS. 11 and 12, an example utilizing four beams is illustrated. FIG. 11 illustrates portions of four signals on which an analog beamforming receiver is directed to sequentially dwell, the signal arriving at the ADC input of the analog beamforming receiver, and a sample position on each beam dwell. FIG. 12 illustrates the samples per beam and the beams after the ADC samples have been demultiplexed.

The ability to switch the beam between samples and return to the beam in time for the next sample allows the beamformer to collect samples from multiple beams simultaneously. It should be noted that while the term "simultaneous" is utilized in the present disclosure to describe how the analog beamforming receiver 300 is able to form multiple independent beams at the same time, the analog beamforming receiver 300 is not configured to dwell on multiple beams at the same instant in time. However, the analog beamforming receiver 300 is simultaneous in the sense that no samples are missing from any of the beams, and from a digital processing perspective, the beams are simultaneous.

Figure 17:
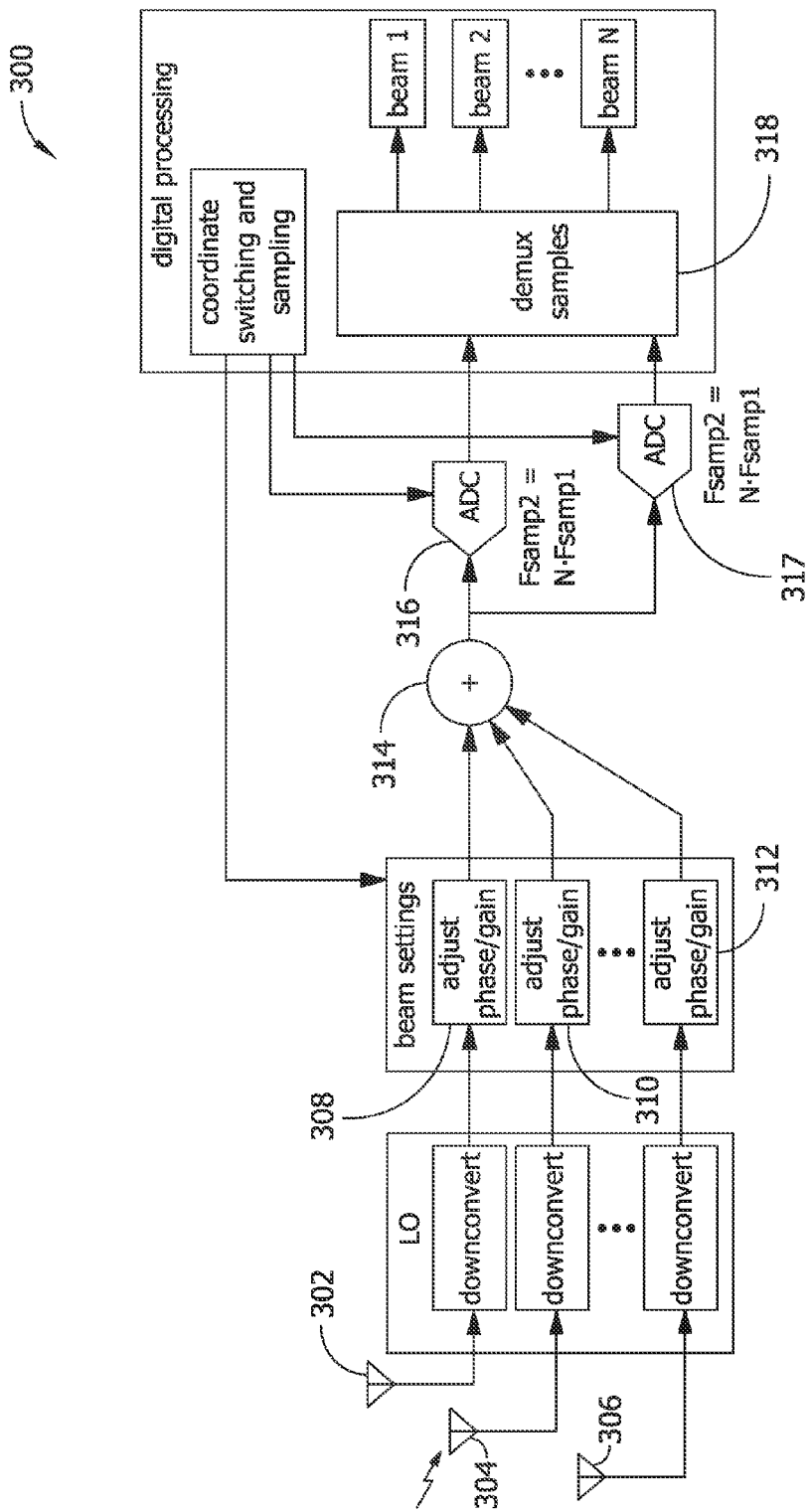
FIG. 17 is a block diagram illustrating an analog beamforming receiver capable of forming multiple simultaneous independent beams, where the analog beamforming receiver utilizes phase/gain adjustment with multiple ADCs.

In embodiments, a single ADC may be utilized with the analog beamforming receiver 300, regardless of the number of simultaneous beams, as long as the ADC is configured for the sample rate N·Fsamp1, and the gain/phase adjustment devices switch with sufficient speed. The samples may then be demultiplexed into the individual streams for further processing, such as demodulation. Thus, the analog beamforming receiver 300 requires that the analog beamforming components that adjust the phase and amplitude of the received signals prior to summing are able to be switched quickly relative to the sample rate required for the signal. With this condition met, rather than camping on one beam between consecutive samples, the beam pattern may be switched. It should be noted that more than one ADC may be utilized with the analog beamforming receiver 300. This may be necessary when a single ADC is not sufficiently fast to handle the desired number of dwells. For example, in an implementation where the switching rate from the combiner is 500 MSps, but the maximum sample rate for an ADC is 250 MSps, the combiner output may be split/switched to route to two ADCs, with each ADC sampling a subset of dwells. In a specific instance, the sample clocks per ADC could sample alternate dwells (e.g., with each ADC sampling half the dwells). While FIG. 17 illustrates an example including a first ADC 316 and a second ADC 317, it will be appreciated that more than two ADCs may be utilized to handle a desired number of dwells.

Further, multiple sets of gain/phase adjustment devices may be utilized with multiple ADCs when a rate for phase/gain switching is not high enough. In this type of implementation, there may be a combined signal for each set of phase/gain devices feeding an ADC. For example, a receiver may have a switching rate of 1 GHz and a maximum sample rate for an ADC of 250 MHz, and the two-sided bandwidth of the signals to be received may be 25 MHz. This signal, aliased down to Fsamp/4, would require a sample rate of at least 50 MHz (the 25 MHz bandwidth signal would alias to between 0 Hz and 25 MHz, where 25 MHz is half the sample rate). In this example, with a max ADC rate of 250 MHz, and 50 MHz required per signal, there could be 250/50=5 beams. However, if 10 beams were required, two sets of phase shifters could be utilized (each with its own ADC); one for beams 1-5 and the other for beams 6-10.

Figure 13:
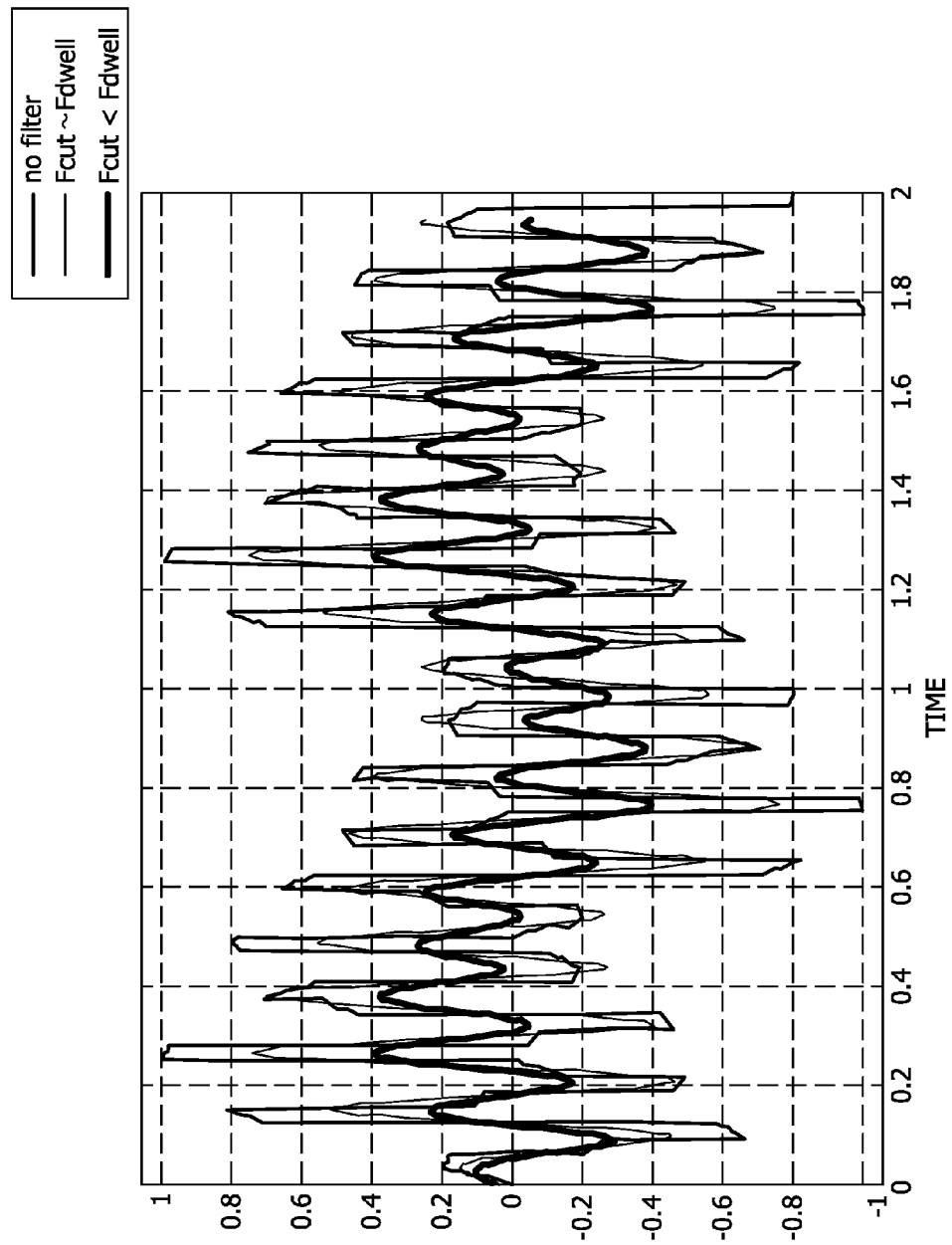
FIG. 13 is a graph illustrating filtered discontinuities caused by filtering between analog beamforming (ABF) and ADC.
Figure 14:
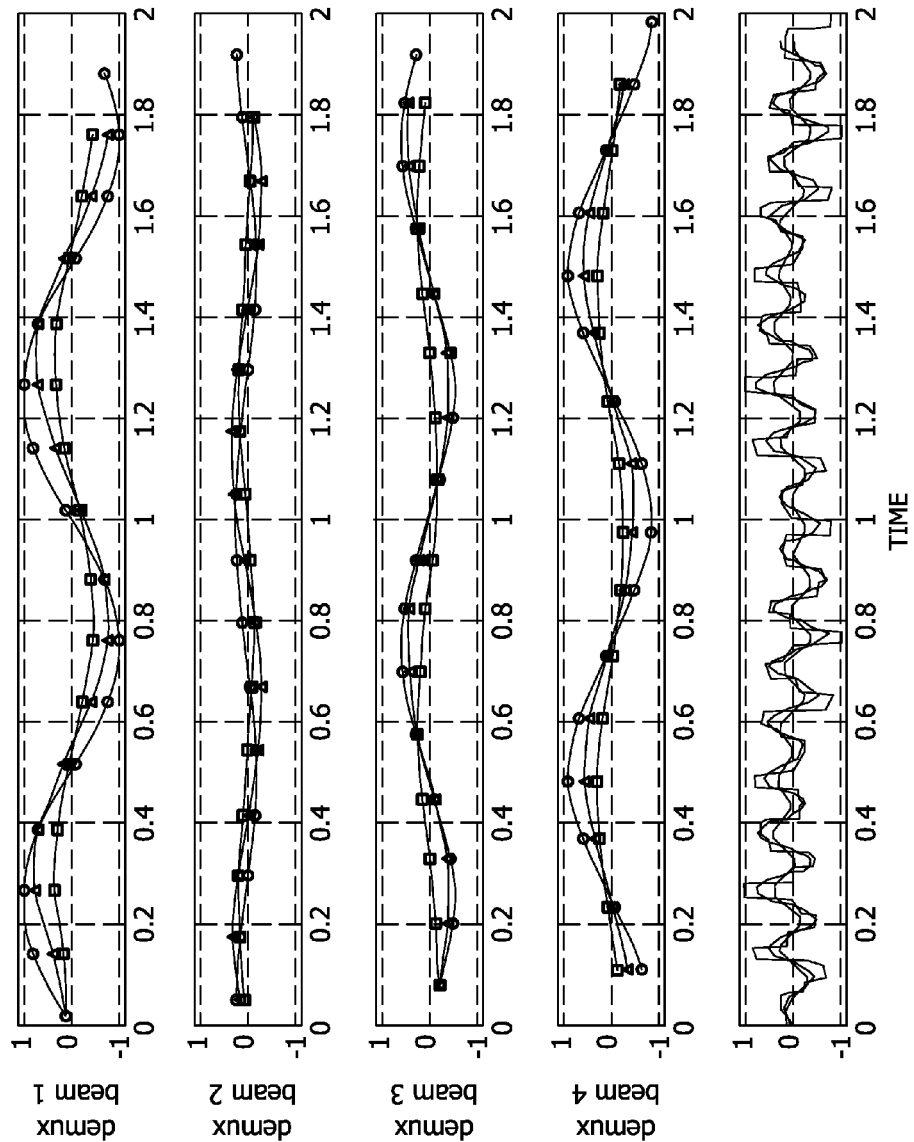
FIG. 14 is a series of graphs illustrating effects on demultiplexed signals caused by the filtering illustrated in FIG. 13.

Referring now to FIGS. 13 through 16, in implementations, each receive path may have a filter prior to the gain/phase adjustment device to restrict out-of-band noise and/or interference. It should be noted that the ability of analog beamformer components to quickly switch causes essentially a discontinuity in the signal at the output of the gain/phase adjustment. If there is filtering between this output and the ADC, the discontinuity may affect the sample taken at the middle of the dwell. For instance, FIG. 13 illustrates an ADC input signal with no filter compared with filtered inputs. It should be noted that a Lowpass Filter (LPF) with a high cutoff frequency (Fcut) relative to dwell frequency (Fdwell) does not affect samples at the middle of dwells. An LPF with Fcut near Fdwell may have some effect on samples at the middle of dwells, while an LPF with Fcut below Fdwell may have a more significant effect on samples at the middle of dwells. FIG. 14 illustrates distorted signals at the ADC output caused by the filtering illustrated in FIG. 13. Thus, it will be appreciated that this type of filtering should be performed before gain/phase adjust and after demultiplexing the digital samples.

Figure 15:
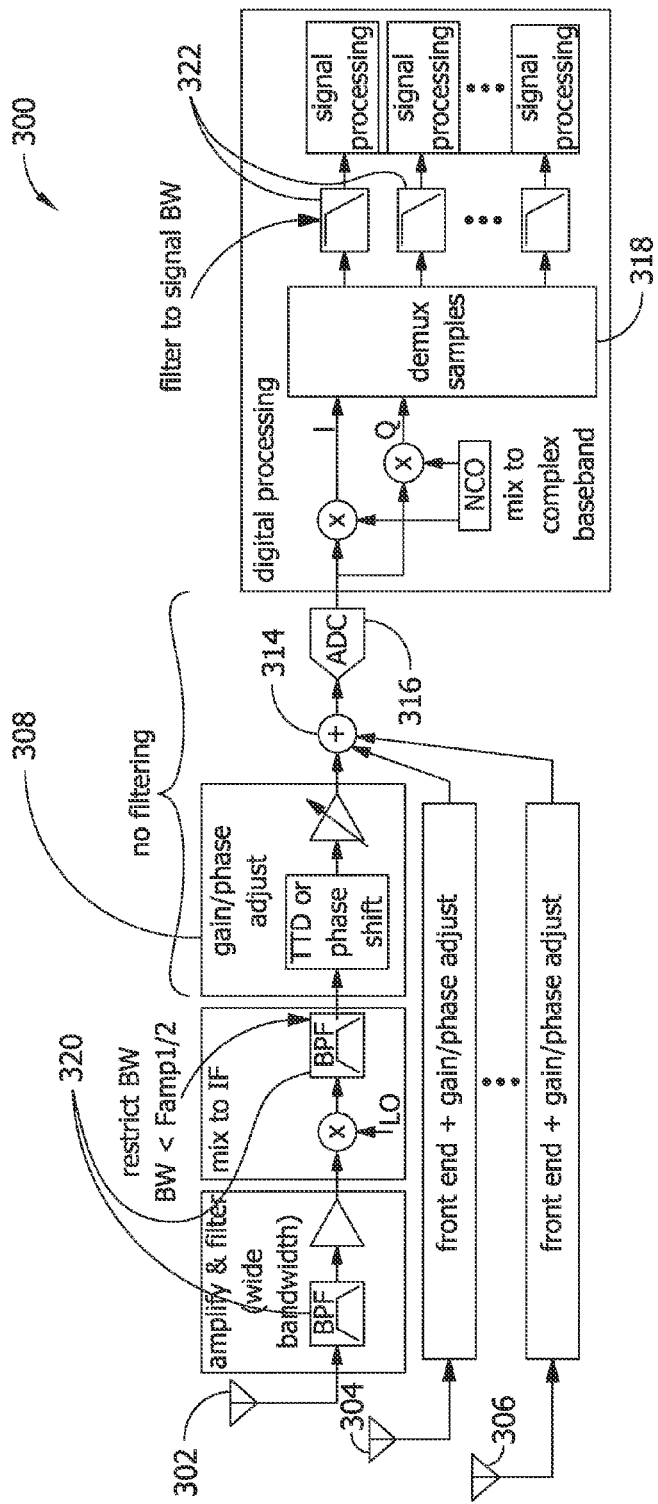
FIG. 15 is a block diagram illustrating filter placement for an analog beamforming receiver.
Figure 16A:
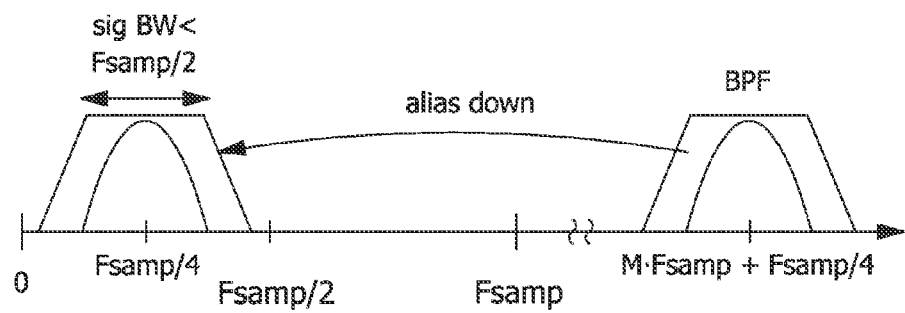
FIG. 16A is a graph illustrating the application of an analog filter to an RF signal from a receive element.
Figure 16B:
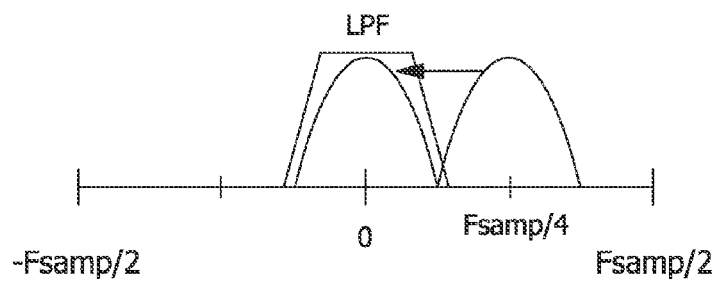
FIG. 16 B is a graph illustrating the application of a digital filter to a digital signal from a demultiplexer.

In embodiments, to avoid aliasing, the sample rate should be at least twice the one-sided bandwidth of the signal. For example, in an embodiment, the sample rate may be equal to the Nyquist rate of the signal (i.e., the two-sided bandwidth of the signal or twice the one-sided bandwidth of the signal). However, a true discontinuity has infinite bandwidth, which makes the discontinuity possible. By coordinating the switching time with the sampling clock, the digital sample position avoids the discontinuity, and the sample is of the bandlimited signal that is present between discontinuities. Thus, as long as the signals at the input to the gain/phase adjust (prior to the discontinuity) are bandlimited to less than Fsamp½, and there is no filtering between the gain/phase adjust devices (which introduce the discontinuity) and the ADC, then the samples may be demultiplexed without aliasing. For example, FIG. 15 illustrates an example embodiment of a receiver architecture with indications on where to filter the signal.

In implementations, the analog beamforming receiver 300 includes one or more analog filters 320 connected between the receive elements 302, 304, and 306 and the phase/gain adjustment circuitry. For example, as described in FIG. 16A, an RF signal may be mixed down such that it is centered at (or aliased to) Fsamp/4, where Fsamp is the sample rate per beam. In this implementation, the anti-aliasing filter has a bandwidth less than Fsamp/2. Thus, when the signal is demultiplexed at complex baseband, the signal will respect the Nyquist rate and not alias. In embodiments, the analog beamforming receiver 300 includes one or more digital filters 322 coupled with the demultiplexer 318 for filtering the demultiplexed signals forming the multiple simultaneous independent beams. For instance, as described in FIG. 16B, in some instances, a digital LPF may be applied to further reduce noise and interference outside the signal bandwidth but inside the anti-aliasing bandwidth. The signal may be mixed to complex baseband and filtered to signal bandwidth. It is contemplated that with Intermediate Frequency (IF) sampling and a narrowband signal, an implementation may require a relatively narrow bandpass filter 320 be applied prior to the gain/phase adjustment. In this type of implementation, it may be desirable to have a relatively low IF, or even mix to complex baseband. Another approach would be to sample the signal at a rate, Fsamp1, which is much higher than the minimum rate. In this case, the bandpass filter 320 may be much wider than the signal bandwidth, and a digital filter 322 may be utilized to remove the additional noise/interference input as a result of the wider IF filter.

In embodiments, a number of simultaneous beams, Nbeams, may be determined by the maximum sample rate of the ADC, Fadc_max; the sample rate per beam, Fsampperbeam; and the ABF switching time, Tswtich, as follows:

$$Nbeams = Fadc\_max/Fsampperbeam$$

The above relationship requires that the ABF components switch sufficiently fast to accommodate. Thus, beam switching should be at a rate greater than the sample rate; otherwise the switching time may consume most or all of the dwell, and the sample for the dwell may be corrupted. In embodiments, the switching may be less than ¼ of a dwell. Then, the analog components providing the gain/phase would be required to switch as follows:

$$Tswitch = 1/(4*Fadc\_max)$$

Given the minimum switching time, Tswitch; the ratio of switching time to dwell time, R; and the maximum ADC rate, Fadc_max, the maximum number of simultaneous beams may be determined as follows:

$$Facd = min(Fadc\_max, (R/Tswitch))$$

$$Nbeams = floor(Fadc/Fsampperbeam)$$

It will be appreciated that the number of beams may be less when the switching time is slower. In a specific implementation, a signal with a bandwidth of 1 MHz is to be received by sampling it at 4 MHz. In an instance where the ADC is capable of providing 200 MSps (Fadc_max=200 MHz); the minimum switching time is 5 ns (Tswitch=5 ns); and the ratio switch/dwell is ¼ (R=0.25), then Fadc=min(Fadc_max, (R/Tswitch))=min(200 MHz, 0.25/5 ns)=min(200 MHz, 50 MHz)=50 MHz, and Nbeams=floor(Fadc/Fsampperbeam)=floor(50 MHz/4 MHz)=floor(12.5)=12. It will be appreciated that if the switching time were not the limiting factor in this example, the number of simultaneous beams would be Nbeams=Fadc_max/Fsampperbeam=200 MHz/4 MHz=50 beams. It should be noted that these specific values are provided by way of example only, and are not meant to limit the present disclosure. Thus, other ABF switching times and ADC sample rates may be utilized to provide other numbers of beams at various numbers of samples per second.

It is also contemplated that when a single set of ABF components is unable to supply sufficient beams, multiple sets may be utilized. For example, in a specific implementation having a 16 beam requirement, two sets of phase/gain shifters may be utilized, where each set of phase/gain shifters provides eight beams. Together, the two sets of phase/gain shifters then provide 16 beams. This example implementation may include a two-way splitter at each receive element for routing to the phase/gain shifters, as well as two combiners, and two ADCs. However, it should be noted that these numbers are provided by way of example only, and are not meant to be restrictive. Thus, other numbers of phase/gain shifters providing different numbers of beams, in combination with associated splitters, combiners, and ADCs may be utilized in accordance with the present disclosure.

Figure 18:
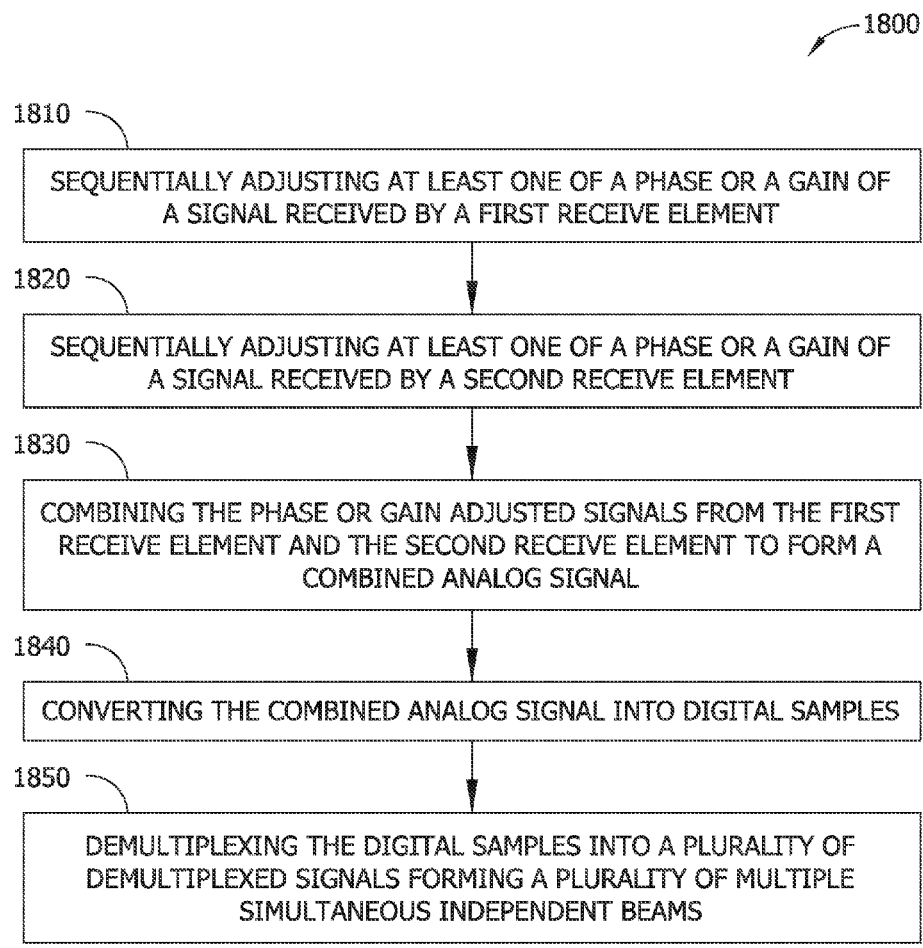
FIG. 18 is a flow diagram illustrating a method for receiving multiple simultaneous independent beams.

Referring now to FIG. 18, a method 1800 for forming multiple simultaneous independent beams may include sequentially adjusting at least one of a phase or a gain of a signal received by a first receive element, 1810. The method 1800 may also include sequentially adjusting at least one of a phase or a gain of a signal received by a second receive element, 1820. The method 1800 may further include combining the phase or gain adjusted signals from the first receive element and the second receive element to form a combined analog signal, 1830. The method 1800 may also include converting the combined analog signal into digital samples, 1840. The method 1800 may further include demultiplexing the digital samples into a plurality of demultiplexed signals forming a plurality of multiple simultaneous independent beams, 1850.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, and the like; and a transmission type medium such as a digital and/or an analog communication medium (e.g., a fiber optic cable, a waveguide, a wired communications link, a wireless communication link (e.g., transmitter, receiver, transmission logic, reception logic, and the like), and the like).

In a general sense, the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, and the like)), and/or electrical circuitry forming a communications device (e.g., a modem, communications switch, optical-electrical equipment, and the like). The subject matter described herein can be implemented in an analog or digital fashion or some combination thereof.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An analog beamforming receiver for forming multiple simultaneous independent beams, comprising:
a first receive element for receiving a radio frequency (RF) signal, the first receive element coupled with circuitry for sequentially adjusting at least one of a phase or a gain of the RF signal received by the first receive element, the first receive element further coupled with an analog filter for filtering the RF signal received by the first receive element before phase or gain adjustment of the RF signal received by the first receive element;
a second receive element for receiving the RF signal, the second receive element coupled with circuitry for sequentially adjusting at least one of a phase or a gain of the RF signal received by the second receive element, the second receive element further coupled with an analog filter for filtering the RF signal received by the second receive element before phase or gain adjustment of the RF signal received by the second receive element;
a combiner coupled with the first receive element and the second receive element for combining the phase or gain adjusted RF signals from the first receive element and the second receive element to form a combined analog signal;
at least a first analog to digital converter and a second analog to digital converter coupled with the combiner for converting the combined analog signal from the combiner into a first plurality of digital samples and a second plurality of digital samples, respectively, wherein the first analog to digital converter and the second analog to digital converter are alternately switched with respect to one another based upon a switching rate of the combiner to sample alternating dwells of the combined analog signal;
a demultiplexer coupled with the first analog to digital converter and the second analog to digital converter for demultiplexing the first plurality of digital samples from the first analog to digital converter and the second plurality of digital samples from the second analog to digital converter into a plurality of demultiplexed signals forming a plurality of multiple simultaneous independent beams; and
one or more digital filters coupled with the demultiplexer for filtering each of the plurality of demultiplexed signals forming a respective one of the plurality of multiple simultaneous independent beams.

2. The analog beamforming receiver of claim 1, wherein the analog filter coupled with the first receive element comprises a narrow bandpass filter with respect to a bandwidth of the RF signal received by the first receive element.

3. The analog beamforming receiver of claim 1, wherein the analog filter coupled with the first receive element comprises a wide bandpass filter with respect to a bandwidth of the RF signal received by the first receive element.

4. The analog beamforming receiver of claim 1, wherein a switching time for the first receive element is coordinated with a sample rate for the analog to digital converter.

5. The analog beamforming receiver of claim 1, wherein a sampling rate of the first analog to digital converter is less than or equal to one half of the switching rate of the combiner.

6. The analog beamforming receiver of claim 5, wherein a sampling rate of the second analog to digital converter is substantially equal to the sampling rate of the first analog to digital converter.

7. A method for forming multiple simultaneous independent beams, comprising:
sequentially adjusting at least one of a phase or a gain of a radio frequency (RF) signal received by a first receive element;
sequentially adjusting at least one of a phase or a gain of the RF signal received by a second receive element;
combining, via a combiner, the phase or gain adjusted RF signals from the first receive element and the second receive element to form a combined analog signal;
converting the combined analog signal into a first plurality of digital samples and a second plurality of digital samples using a first analog to digital converter and a second analog to digital convertor, respectively, wherein the first analog to digital converter and the second analog to digital converter sample alternating dwells of the combined analog signal, each at a sampling rate less than or equal to one half of a switching rate of the combiner;
demultiplexing the first plurality of digital samples and the second plurality of digital samples into a plurality of demultiplexed signals forming a plurality of multiple simultaneous independent beams; and
digitally filtering each of the plurality of demultiplexed signals forming a respective one of the plurality of multiple simultaneous independent beams.

8. The method of claim 7, further comprising:
filtering the RF signal received by the first receive element before sequentially adjusting the at least one of the phase or the gain of the RF signal.

9. The method of claim 8, wherein filtering the RF signal received by the first receive element comprises narrow bandpass filtering with respect to a bandwidth of the RF signal.

10. The method of claim 7, further comprising:
filtering the RF signal received by the first receive element before sequentially adjusting the at least one of the phase or the gain of the RF signal, wherein filtering the RF signal received by the first receive element comprises wide bandpass filtering with respect to a bandwidth of the RF signal.

11. The method of claim 7, wherein a switching time for sequentially adjusting the at least one of the phase or the gain of the signal received by the first receive element is coordinated with a sample rate for converting the combined analog signal into the plurality of digital samples.

12. A system for forming multiple simultaneous independent beams, comprising:
a first adjustment module for sequentially adjusting, via at least one of a processor or an electronic circuit, at least one of a phase or a gain of a radio frequency (RF) signal received by a first receive element;
a second adjustment module for sequentially adjusting, via at least one of a processor or an electronic circuit, at least one of a phase or a gain of the RF signal received by a second receive element;
a combining module coupled with the first adjustment module and the second adjustment module for combining, via at least one of a processor or an electronic circuit, the phase or gain adjusted RF signals from the first receive element and the second receive element to form a combined analog signal;
a first analog to digital conversion module coupled with the combining module for converting, via at least one of a processor or an electronic circuit, the combined analog signal from the combining module into a first plurality of digital samples;
a second analog to digital conversion module coupled with the combining module for converting, via at least one of a processor or an electronic circuit, the combined analog signal from the combining module into a second plurality of digital samples, wherein the first analog to digital conversion module and the second analog to digital conversion module are alternately switched with respect to one another based upon a switching rate of the combining module to sample alternating dwells of the combined analog signal, wherein the first analog to digital conversion module and the second analog to digital conversion module each have a sampling rate less than or equal to one half of a switching rate of the combining module;
a demultiplexing module coupled with the first analog to digital conversion module and the second analog to digital conversion module for demultiplexing, via at least one of a processor or an electronic circuit, the first plurality of digital samples from the first analog to digital conversion module and the second plurality of digital samples from the second analog to digital conversion module into a plurality of demultiplexed signals forming a plurality of multiple simultaneous independent beams, where a switching time for the first adjustment module and the second adjustment module is coordinated with a sample rate for the analog to digital conversion module; and
one or more digital filters coupled with the demultiplexing module for filtering each of the plurality of demultiplexed signals forming a respective one of the plurality of multiple simultaneous independent beams.

13. The system of claim 12, further comprising:
an analog filter coupled with the first adjustment module for filtering the RF signal received by the first receive element.

14. The system of claim 13, wherein the analog filter comprises a narrow bandpass filter with respect to a bandwidth of the RF signal received by the first receive element.

15. The system of claim 12, further comprising:
an analog filter coupled with the first adjustment module for filtering the RF signal received by the first receive element, where the analog filter comprises a wide bandpass filter with respect to a bandwidth of the RF signal received by the first receive element.

* * * * *